United States Patent
Henspeter et al.

(10) Patent No.: US 11,644,878 B2
(45) Date of Patent: May 9, 2023

(54) CONFIGURABLE VRM CARD

(71) Applicant: International Business Machines Corporation, Armonk, NY (US)

(72) Inventors: Justin Henspeter, Kasson, MN (US); Michael Lee Miller, Rochester, MN (US); Jordan Keuseman, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 17/120,139

(22) Filed: Dec. 12, 2020

(65) Prior Publication Data

US 2022/0187888 A1  Jun. 16, 2022

(51) Int. Cl.
*G06F 1/26* (2006.01)
*H02M 1/00* (2006.01)
*G06F 1/18* (2006.01)

(52) U.S. Cl.
CPC .............. *G06F 1/26* (2013.01); *H02M 1/00* (2013.01); *G06F 1/188* (2013.01); *G06F 1/189* (2013.01); *G06F 1/263* (2013.01)

(58) Field of Classification Search
CPC . G06F 1/26; G06F 1/263; G06F 1/188; G06F 1/189; H02M 1/00
USPC .......................................... 713/300; 700/298
See application file for complete search history.

(56) References Cited

U.S. PATENT DOCUMENTS

| | | |
|---|---|---|
| 6,594,556 B1 | 7/2003 | Agatstein et al. |
| 6,710,621 B2 | 3/2004 | Devlin et al. |
| 7,023,188 B1 | 4/2006 | Rice |
| 8,878,501 B2 | 11/2014 | Kalje et al. |
| 8,901,774 B2 | 12/2014 | Yan et al. |
| 9,030,047 B2 | 5/2015 | Barus et al. |
| 9,490,702 B1 | 11/2016 | Zhak et al. |
| 9,847,705 B2 | 12/2017 | Oaklander |
| 10,126,791 B2 | 11/2018 | Beeston et al. |
| 10,317,966 B2 | 6/2019 | Johnson et al. |
| 2004/0019815 A1 | 1/2004 | Vyssotski et al. |
| 2015/0280563 A1* | 10/2015 | Tang ................ H02M 3/158 323/271 |
| 2016/0079858 A1* | 3/2016 | Chen ................ H02M 1/00 323/271 |
| 2016/0233766 A1* | 8/2016 | Todorov .......... H02M 3/1584 |
| 2018/0364784 A1* | 12/2018 | Luo ................ G06F 13/4072 |

* cited by examiner

*Primary Examiner* — Ji H Bae
(74) *Attorney, Agent, or Firm* — Peter J. Edwards (57) ABSTRACT

A discrete VRM card comprises a set of VRM controllers. The set of VRM controllers comprises a VRM controller with two feedback loops. The VRM card comprises a power stage and a power-stage critical-signal multiplexer. The output of the power-stage critical-signal multiplexer determines a feedback loop with which the power stage communicates. The VRM card also comprises a configuration selector. The configuration selector determines a feedback-loop assignment for the power-stage critical-signal multiplexer and provides VRM instructions to the VRM controller.

25 Claims, 6 Drawing Sheets

CONFIGURABLE VRM CARD

BACKGROUND

The present disclosure relates to voltage regulation modules, and more specifically, to pluggable voltage regulation module cards.

Voltage regulation modules (sometimes referred to herein as "VRMs") are used in many electronics systems to provide voltage and current to various electronics components according to the requirements of those components. VRMs typically are composed of at least one semiconductor switch (e.g., a MOSFET switch) and at least one inductor (sometimes referred to as a "choke"). Some VRMs also include capacitors located near the inductors or near the components to which the VRMs are delivering power. The VRM components that together provide voltage and current (e.g., a MOSFET switch and inductor pair) are often referred to collectively as a "power stage." These VRM components are often controlled by a circuit referred to as controller (sometimes referred to as a "VRM controller").

The VRM controller is used to control the components of the VRM to provide delivery of current at a given voltage. When a VRM controller closes a semiconductor switch (i.e., turning on the power stage), for example, current flows through the VRM. The inductor of the VRM slows the change in voltage at the VRM output as a result of this current, preventing unwanted voltage spikes or drops in the power delivered to the system components. Some VRMs also include capacitors, which can smooth out the power output by the VRM, preventing "ripples" in the voltage that can be caused by, for example, conversion between multiple voltages or by electronic noise in the system.

Some VRMs support multiple groups of power stages that can be combined into a single VRM output. These groups can be controlled by the VRM controller to operate as a system that provides one voltage output. In such VRMs, each power stage often also requires capacitance for its output. This capacitance may be provided by a capacitor that is dedicated to that power stage, or by a source of capacitance that is shared among multiple power stages. By alternating the power stages that are outputting power, the VRM can sometimes deliver smoother, more stable power to the system components than with a single-power-stage VRM.

In some electrical systems, it can be very important to deliver power within a very narrow range of voltage. Further, in some electrical systems, even a very temporary malfunction of the VRM to deliver power within the voltage range can result in significant system or business losses. In these systems, VRMs with reliable components and multiple power stages are often used. However, these VRM solutions can be very expensive, and are also typically included in systems that have other very expensive components (e.g., backplanes and processor packages mounted thereon). In some systems, VRMs are integrated into the system (e.g., permanently mounted onto the system backplane). However, in systems with an integrated VRM, failure of a VRM component can necessitate the replacement a large portion of the system, including other expensive components. Similarly, failure of another system component could also require replacement of a large portion of the system, including the integrated VRM.

For this reason, expensive electrical systems are often designed to utilize add-in VRM cards (sometimes referred to as "discrete VRM cards" or simply "VRM cards") rather than a VRM embedded within the system (e.g., on the system backplane or motherboard). An add-in VRM card may be a discrete printed circuit board that can be plugged into the system through a port on the system board. That VRM card would be configured to provide power that matches the particular requirements of the system components though that port.

In these systems, if a component on the system board fails, even if the entire system board requires replacing, the expensive VRM solution may be capable of being reused in the replacement board. Similarly, if a component in the VRM card fails, the VRM card could be replaced and the rest of the system could be reused. However, in some systems, the components of a VRM may be usable for significantly longer than the expected life of the remainder of the system. For example, many systems encounter a component failure elsewhere in the system far before a VRM component is likely to fail. Even if no component fails, system components may become obsolete far before a VRM component is likely to fail or become obsolete. However typical VRM cards are configured to provide power to the specific requirements of a specific system, and thus often cannot be transferred to a new system when that specific system is replaced. For this reason, the expensive VRM card may be discarded before necessary, adding cost to system maintenance in the long run.

SUMMARY

Some embodiments of the present disclosure can be illustrated as a discrete VRM card. The discrete VRM card comprises a set of PWM controllers. The set comprises a VRM controller with two feedback loops. The VRM card also comprises a power stage. The VRM card also comprises a power-stage critical-signal multiplexer. The output of the power-stage critical-signal multiplexer determines a feedback loop with which the power stage communicates. Finally, the VRM card comprises a configuration selector. The configuration selector determines a feedback loop assignment for the power-stage critical-signal multiplexer and provides VRM instructions to the VRM controller. These embodiments may beneficially enable the discrete VRM card to provide power to systems with various power-input requirements.

Some embodiments of the present disclosure can be illustrated as the above discrete VRM card in which the configuration selector is configured to receive a system power property from a computer system with which the discrete VRM card is connected. The feedback-loop assignment and VRM instructions are based on the system power property. These embodiments may increase the ability of the VRM card to adjust to systems with various power-input requirements.

Some embodiments of the present disclosure can also be illustrated as one of the above discrete VRM cards in which the feedback-loop assignment is a voltage signal within a pre-determined voltage range. These embodiments may provide a low-complexity means of communicating the feedback-loop assignment.

Some embodiments of the present disclosure can also be illustrated as a method. The method comprises plugging a VRM card into a system board of a computer system. The method also comprises detecting a power property of the computer system. The method also comprises identifying a VRM card configuration based on the power property. The method also comprises sending VRM instructions to a set of VRM controllers on the VRM card. The method also comprises sending a set of feedback-loop assignments to a power-stage critical-signal multiplexer based on the identifying. The method also comprises operating the VRM card according to the VRM instructions and feedback-loop assignments. This method may beneficially enable a discrete VRM card to provide power to systems with various power-input requirements.

Some embodiments of the present disclosure can also be illustrated as the above method in which the VRM instructions comprise a signal that identifies a configuration file. These embodiments may provide a low-complexity means of communicating the VRM instructions.

Some embodiments of the present disclosure can also be illustrated as one of the above methods detecting the power property comprises performing impedance measurements on a set of contacts that form a connection between a set of power stages on the VRM card and a set of components in the computer system. These embodiments may provide a means of detecting a power property on systems that are not able to otherwise provide the power property.

Some embodiments of the present disclosure can also be illustrated as a computer program product that comprises a computer readable storage medium. The computer readable storage medium has program instructions embodied therewith. These program instructions are executable by a VRM card to cause the VRM card to detect that the VRM card is inserted into a computer system. These program instructions are also executable by the VRM card to cause the VRM card to detect a power property of the computer system. The program instructions are also executable by the VRM card to cause the VRM card to identify a VRM card configuration based on the power property. The program instructions are also executable by the VRM card to cause the VRM card to send VRM instructions to a VRM controller on the VRM card. The program instructions are also executable by the VRM card to cause the VRM card to send a feedback-loop assignment for a. power-stage critical-signal multiplexer on the VRM card. These embodiments may beneficially enable the VRM card to provide power to systems with various power-input requirements.

Some embodiments of the present disclosure can also be illustrated by the above computer program product in which the detection of the power property comprises reading a set of voltage signals set to the VRM card and categorizing each voltage signal in the set into a voltage range. The voltage range is in a set of pre-determined voltage ranges. The detection of the power property also comprises forming a VRM configuration number based on the categorizing. These embodiments may provide a low-complexity means of identifying and communicating a VRM configuration number.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to voltage regulation modules, and more specifically, to pluggable voltage regulation module cards. While the present disclosure is not necessarily limited to such applications, various aspects of the disclosure may be appreciated through a discussion of various examples using this context.

Typical computer systems make use of voltage regulation modules (sometimes referred to herein as "VRMs") to manage the delivery of power to the various components of the computer system within the specifications of those components. For example, a computer system with a 12V power supply may include a first VRM that is responsible for converting the system's 12V power to 3V for the system processor and a second VRM that is responsible for converting the system's 12V power to 1.2V for the system memory. A typical VRM includes an inductor (sometimes referred to as a "choke"), which not only can be used to step the voltage down to the desired level, but is also often responsible for preventing abrupt changes in the output voltage. VRMs also often include a capacitor that is fed by the inductor. The capacitor may be used to filter out ripples in the output power, and to avoid voltage drops or surges when the current required by the consuming component suddenly increases or decreases. In these VRMs, a single capacitor or group of capacitors may be shared by the inductors of the VRM, or each inductor may have its own dedicated capacitance. The inductor of a VRM is typically fed by a semiconductor switch (e.g., a MOSFET switch) that allows current to flow to the inductor when the switch is closed. The VRM components that switch and step down voltage may be referred to herein as "power stages." Typically power stages contain a pair of switches, an associated inductor, drivers, telemetry, fault protection.

VRMs often include a controller that adjusts the setting of the power stage based on the VRM output and the needs of the consuming component. For example, a VRM controller (also referred to herein as a "VRM controller") may open and close the switch of a power stage to increase and decrease the voltage output by the VRM. When such a VRM controller closes a power stage's semiconductor switch, for example, power is provided to the inductor, causing the inductor to charge. As the inductor charges, the voltage output by the inductor (and thus the voltage output by the VRM) increases. If the VRM controller is targeting an output voltage of 1.4V for a memory module, for example, it may close the switch when the VRM controller detects that the VRM is outputting 1.398V and allow the inductor to charge. When the VRM controller detects that the VRM output has increased to 1.402V, however, it may open the switch, shutting off the power to the inductor (i.e., shutting off the power stage). By quickly varying the state of the power stage, sometimes at a regular pattern referred to as a "duty cycle," the VRM controller can increase the likelihood that the VRM is providing output of a voltage that is within the specification of the computer-system components.

In typical VRMs, a VRM controller detects the properties of the voltage output by the VRM with a feedback loop. With a feedback loop, the VRM can monitor, for example, the voltage that is being provided to the system components and quickly react if circumstances cause the output voltage being to rise or drop higher or below component requirements. For example, if a change in processor workload causes a sudden increase in the current drawn by the processor, the output voltage of the VRM may drop to dangerously low levels. Using the VRM feedback loop, the VRM controller should be able to detect this drop in voltage almost instantly, enabling the VRM to react quickly (e.g., to increase the duty cycle of a power stage).

As a result of this on-off nature of VRM power cycling, the actual voltage of the output of a VRM inductor often resembles an oscillating wave centered around a target voltage. The size of this wave (i.e. the typical high and low deviations from the target voltage that are output by the inductor) can depend on the requirements of the components to which the output is being provided. For particularly sensitive components, only small deviations may be acceptable in order to maximize system performance or avoid system instability. Thus, in the above example, instead of outputting between 1.398V and 1.402V, a VRM that is powering to a memory module in a high-performance server may be required to output voltage between 1.3999V and 1.4001V.

Similarly, some systems may typically involve very fast changes in current drawn by a component, which may result in significant sudden changes in a VRM's output voltage. For example, a graphics processing unit (sometimes referred to herein as a "GPU") may alternate between requiring a very small amount of current to a comparatively very large amount of current, and back to a comparatively very small amount of current. If this GPU is also sensitive to changes in voltage above a reasonable threshold, the GPU may require that the VRM be able to react very quickly to these voltage changes. However, the rate at which the VRM can respond is limited to the power stage effective inductance.

In these situations, a VRM that is relying on a single power stage may not result in sufficient performance or reliability and additional parallel power stages can be employed to improve the response. In these VRMs, each power stage may be independently controlled by the VRM controller, and may be referred to as an independent "power stage. These power stages sometimes each include a dedicated capacitor to, for example, eliminate voltage ripple of the output. On the other hand, these power stages sometimes share a common source of capacitance (e.g., a capacitor or set of capacitors that is shared among all power stages of a given output).

For example, a system processor may run with acceptable stability in a voltage range of 2.7V to 3.3V, but may achieve the maximum performance between 3.298V and 3.300V. In order to provide power to the processor within this maximum-performance range, a VRM with a single power stage may be insufficient, causing even small variations in the output provided by the VRM or requested by the processor to potentially increase above the 3.3V stability limit, requiring the processor to shut down. However, a VRM with, for example, four power stages may be capable of providing power within the maximum-performance range.

In a typical VRM with multiple power stages, the VRM controller sets the duty cycle of each power stage to cause the overall output of the VRM to comply with the requirements of the system component to which the VRM is providing power. For example, in a VRM with two power stages, the VRM may drive the power stages out of phase with respect to each other. In other words, the VRM may close the semiconductor switch of the first power stage in a periodic pattern and close the semiconductor switch of the second power stage in an offset periodic pattern, such that the two power stages alternate.

In some computer systems, each electrical component (or component subsystem) may have a dedicated VRM. For example, in some systems, a first VRM may provide power to a first processor die, a second VRM may provide power to a second processor die, and a third VRM may provide power to a system memory. In this system, each VRM may have its own set of power stages and its own VRM controller. However, in some computer systems, multiple sets of power stages can share a single VRM controller. For example, a processor die may be provided power by a first set of power stages and the system memory may be provided power by a second set of power stages. However, these two sets of power stages may each be controlled by a single VRM controller.

In a system in which a single VRM controller manages more than one set of power stages for more than one system component, the VRM controller typically must be able to independently monitor and react to the properties of the voltage output to each component. As such, these VRM controllers typically incorporate multiple feedback loops. A first set of power stages, for example, could be connected to a first feedback loop, and a second set of power stages could be connected to a second feedback loop. Even though these sets of power stages would independently power outputs and be independently monitored by independent feedback loops, a single VRM controller could control each set of power stages, and thus they may be referred to herein and belonging to the same VRM.

In some industries and use cases within some industries, maintaining high performance of a system powered by a VRM (or set of VRMs) can be extremely important. An inability of a VRM to consistently provide output voltages within a narrow range of system requirements can, in some circumstances, require system components to be operated at lower performance levels, reducing overall system performance. Further, a temporary failure of a VRM to provide output voltage with a component's stable range may cause the component to malfunction, requiring a system restart. In either circumstance, the consequences could potentially lead to a costly reduction in system performance. Thus, in use cases in which VRMs are required to consistently operate within very specific ranges, VRMs with a high number of power phases and very reliable, high-quality components (e.g., semiconductor switches and capacitors) are often used.

However, equipping a VRM with multiple power stages that are composed of reliable, high-quality components can significantly increase the cost of the VRM. Unfortunately, this can also increase the cost of the overall computer system into which the VRM is integrated. This detriment can be exacerbated when a VRM is integrated into the system (e.g., on the system motherboard or backplane). In these systems, a failure of a non-VRM component may require replacement of a significant amount of the system, including the component onto with the VRM is integrated (e.g., the motherboard or GPU board). In these instances, an expensive VRM that is functioning perfectly within system requirements may need to be replaced. Similarly, if a component of an integrated VRM (e.g., a capacitor) begins to malfunction, replacing it may also require replacing other system components, such as an integrated, expensive, and perfectly functioning central processing unit. Over time, these incidental and unnecessary replacement costs can significantly increase the maintenance costs in use cases with multiple computer systems.

For these reasons, expensive computer systems are often designed to utilize discrete VRM cards (sometimes referred to herein as "add-in VRM cards" or simply "VRM cards") that can be attached to (and removed from) the system through a standard or proprietary socket (for example, a socket designed to accept a card-edge connector). An add-in VRM card can typically be plugged into and removed from a system if the system is not powered on. Thus, if a non-VRM component of a system fails and the system is replaced with a replacement system with identical voltage requirements, it is possible that the discrete VRM could be removed from the failed system and plugged into the replacement system. In this circumstance, the expensive VRM could be reused, potentially reducing the replacement cost (and long-term maintenance) significantly.

Unfortunately, sometimes system requirements change, and sometimes it may not be advisable, or even feasible, to replace a failed system with a replacement system whose voltage requirements are identical to the failed system's voltage requirements. For example, if a failed processor requires replacement of the system backplane (for example, if the processor package is soldered to the backplane), it may be desirable to replace the system backplane and processor with updated components (e.g., a more modern processor model) that has higher performance and efficiency. However, if both systems use a discrete VRM to power the processor, the discrete VRM that was used to power the failed processor may not meet the requirements of the updated processor.

This situation may also occur when system components are updated absent system failures. For example, high-performance use cases may operate on a regular upgrade cycle in order to maintain high performance across the system. These high-performance systems are often the same types of system that require expensive, reliable VRMs, and thus benefit from discrete VRMs rather than integrated VRMs. Unfortunately, the requirement for modern system components may frequently result in the discrete VRM needing to be replaced when other system components are replaced, limiting the benefit derived from using a discrete VRM design.

Some embodiments of the present disclosure address the above limitations by enabling discrete VRM designs to be reconfigurable based on the requirements of the system into which they are added. For example, a discrete VRM card may configure itself to provide two outputs when plugged in to a first system. The first output may be a central processing unit that operates at 3.5V and requires 4 power stages, and the second output may be system memory that operates at 1.2V and requires 2 power stages. That same discrete VRM card may configure itself to provide three outputs, however, when plugged into a second system. The first output may be a central processing unit that operates at 4.0V and requires 6 power stages, the second output may be a graphics processing unit that operates at 1.0V and requires 4 power stages, and the third output may be system memory that operates at 1.4V and requires 2 power stages.

Some embodiments of the present disclosure may include a VRM card design that features multiple controllers. For example, a single VRM card may include three controller chips that all include two feedback loops. This would enable the single VRM card to output, if necessary, six independent power sources. As another example, a simpler VRM card may include a single controller chip with two feedback loops. This would enable the simpler VRM card to output, if necessary, two independent power sources.

Some embodiments of the present disclosure may also include a power-stage critical-signal multiplexer attached to each power stage of a VRM card. The power-stage critical-signal multiplexers may enable each power stage to be connected to any of the loops of the VRM card, depending on the desired VRM configuration. For example, a VRM card may include 10 power stages, each of which with a power-stage critical-signal multiplexer attached. Each of these power-stage critical-signal multiplexers may include multiple outputs that can enable the VRM card to select the feedback loop to which each power stage is connected. For example, if the 10-power stage VRM card also includes 2 controllers and a total of 4 feedback loops, each of the 10 power-stage critical-signal multiplexers may include four outputs (one for each feedback loop). By selecting the first output for the first 4 power-stage critical-signal multiplexers, the first 4 power-stage critical-signal multiplexers could be connected to the first feedback loop. In other words, the first 4 power stages would be combined into a single output power source that is controlled by the first feedback loop. Similarly, by selecting the third output for power-stage critical-signal multiplexers 5-8, power stages 5-8 would be combined into a single output power source that is controlled by the third feedback loop. Finally, by selecting the fourth output for power-stage critical-signal multiplexers 9 and 10, power stages 9 and 10 would be combined into a single output source that is controlled by the fourth feedback loop.

Some embodiments of the present disclosure provide instructions to each VRM controller when the VRM card is plugged into a computer system. These instructions may inform the controller of the power stages that it is controlling, the default voltage level for those power stages, and the required voltage range of each output. Thus, when a VRM card is plugged into a system for which the first feedback loop is required to output a 3-power-stage signal for a set of memory, the VRM card may provide instructions to the VRM controller that inform the controller that the first feedback loop is controlling power stages 9, 10, and 11 at a particular target voltage. When the VRM card is plugged into a second system for which the first feedback loop is required to output a 10-power-stage signal for a CPU core, the VRM card may provide instructions to the VRM controller that inform the controller that the first feedback loop is controlling power stages 1-10 at a particular target voltage.

In some embodiments, these instructions to the VRM controller are provided in the form of a configuration file. For example, when plugged into a first system, the VRM card may provide instructions to a VRM controller to load a first configuration file. That first configuration file may provide the VRM controller with information that is necessary to control the power stages assigned to the VRM controller. However, when plugged into a second system, the VRM card may provide instructions to a VRM controller to load a second configuration file. The second configuration file may provide different instructions than the first configuration file based on the needs of the second system. That said, like the first configuration file, the second configuration file may provide a list of power stages that are assigned to the VRM controller's feedback loops, and the instructions necessary to control those power stages (e.g., voltage targets).

Some embodiments of the present disclosure incorporate a configuration selector. In some embodiments, the configuration selector may take the form of a resistor, pin, or simple circuit that sends a signal to the VRM controller. This signal may inform the VRM controller of the configuration file that the VRM controller should load. This configuration file may identify the power stages that are assigned to the VRM controller. With this information, the VRM controller can inform the power-stage critical-signal multiplexers of the correct output to be directed to the proper feedback loop.

In some embodiments, the configuration selector may inform the power-stage critical-signal multiplexers and controller(s) of what VRM card configuration is required by the system into which the VRM card is inserted. For example, a VRM card may be designed with only 2 configurations, which may be selected depending on whether the VRM card is inserted into system A or system B. When the VRM card is inserted into system A, the configuration selector may recognize a property of the system and send a signal to the VRM controller(s) and power-stage critical-signal multiplexers that informs them to use the "system A configuration." However, if that same VRM card is inserted into system B, the configuration selector may recognize a property of system B and send a signal to the VRM controller(s) and power-stage critical-signal multiplexers that informs them to use the "system B configuration."

The form of the configuration selector may vary based on the requirements of the implementation. For example, a discrete VRM card that is designed to only be used in a small number of systems, and thus is designed to only alternate between a small number of different configurations, a set of pins or resistors that are able to send a "high or low" signal to a VRM controller, or a short binary code based on which of those pins are set to "high" may be sufficient in some embodiments.

However, as the number of possible configurations in which the VRM card is designed to be used increases, simple configuration selector designs may become insufficient. Thus, some VRM cards incorporate configuration selectors that are more complex, such as a multiplexer, an application-specific integrated circuit (sometimes referred to as an "ASIC") or a field-programmable gate array (sometimes referred to as an "FPGA").

For example, a VRM card could incorporate an ASIC configuration selector in VRMs that are designed to switch between more configurations than would be feasible to incorporate into a set of pins. The added complexity of an ASIC could enable the VRM card to be designed for significantly more configurations. Similarly, a VRM card could incorporate an FPGA configuration selector. Similar to an ASIC, an FPGA configuration selector may be beneficial when a VRM card is designed to switch between a larger number of configurations.

Figure 1A:
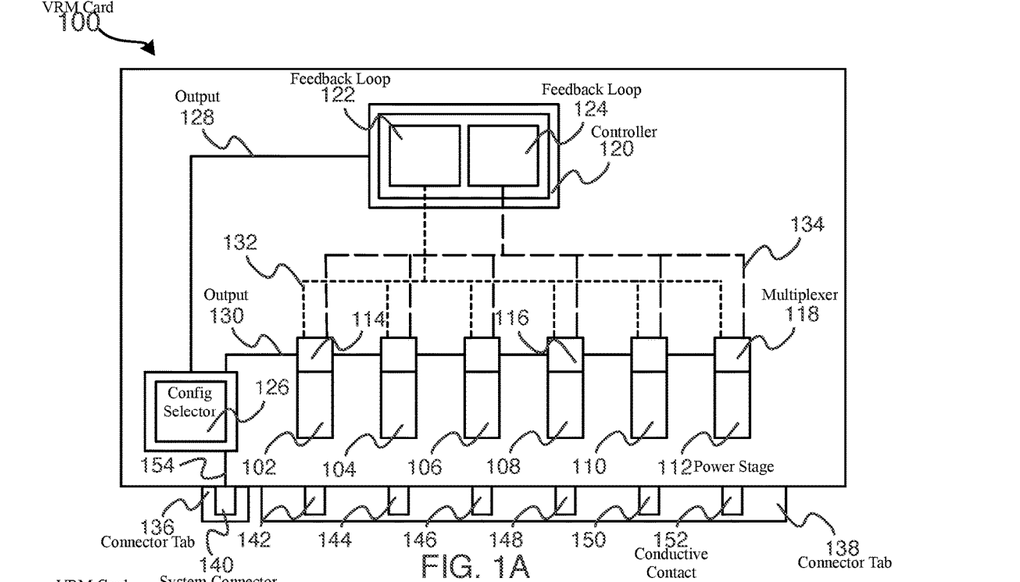
FIG. 1A depicts a first view of a configurable discrete VRM card before being attached to a system.

FIG. 1A depicts a first view of a configurable discrete VRM card 100 before being attached to a system. VRM card 100 comprises 6 power stages 102-112. Each of power stages 102-112 could include a power stage, inductor, and capacitor (not individually depicted). Each of power stages 102-112 are also connected to a power-stage critical-signal multiplexer, such as power-stage critical-signal multiplexer 114 (connected to power stage 102), power-stage critical-signal multiplexer 116 (connected to power stage 108), and power-stage critical-signal multiplexer 118 (connected to power stage 112).

VRM card 100 comprises a single controller chip 120 that has two feedback loops 122 and 124 for controlling power stages 102-112. This permits VRM card 100 to be divided into two separate outputs. In other word, VRM card could simultaneously provide an output at one voltage to one system component and an output at a second voltage to a second system component. VRM card also includes a configuration selector 126. Configuration selector 126 could, for example, take the form of a set of pins, a simple circuit, an ASIC, an FPGA, or control chip.

Configuration selector 126 comprises two outputs: 128 and 130. Output 128 is designed to provide instructions to controller 120. These instructions may take various forms based on the implementation of VRM card 100. For example, if VRM card 100 is designed to use only two configurations, the instructions carried by output 130 could take the form of a "high" signal (e.g., a 5V signal, sometimes interpreted as "true" or "on") or a "low" signal (e.g., a 0V signal, sometimes interpreted as "false" or "off"). If VRM card 100 is designed to use more than two configurations, the instructions carried by output 130 could take the form of a configuration number (e.g., configuration "5") or a binary code for a configuration (e.g., "101"), which may inform VRM controller 120 which configuration file to retrieve from a memory. That configuration file may inform VRM controller 120 which power stages each of loops 122 and 124 are controlling, and what the voltage restrictions are. In some embodiments, VRM controller 120 may not be connected to a memory, in which case the instructions carried by output 128 may provide the configuration-file information.

Output 130 is designed to provide instructions to the power-stage critical-signal multiplexers. These instructions could take the form of a configuration number (similar to the configuration number that could be provided using output 128) or a list of outputs that each power-stage critical-signal multiplexer is to use.

Each power-stage critical-signal multiplexers for each of power stages 102-112 comprise two outputs that connect those power-stage critical-signal multiplexers to either feedback loop 122 or feedback loop 124 based on the instructions received from configuration selector 126. As illustrated the small dashed line 132 represents the conductive traces (e.g., copper wire) that could connect each power-stage critical-signal multiplexer to feedback loop 122. Large dashed line 134, on the other hand, represents the conductive traces that could connect each power-stage critical-signal multiplexer to feedback loop 124. Through these connections, each power stage 102-112 would be able to send an interface signal or set of interface signals to the assigned feedback loop 122 or 124. Of note, the paths shown by each of small dashed line 132 and large dashed line 134 are simplified and conjoined for the sake of understanding in FIG. 1A. In some embodiments, each power-stage critical-signal multiplexer may have an independent connection to each of feedback loops 122 or 124. Thus, in some embodiments, each of feedback loops 122 and 124 may have six connection to the power-stage critical-signal multiplexers (i.e., one connection for each of power stages 102-112).

VRM card 100 comprises two connector tabs 136 and 138 that could be inserted into a slot of a computer system, such as in a motherboard or a system backplane. For example, connector tabs 136 and 138 could take the form of card-edge contacts on the edge of the circuit board on which VRM card 100 is constructed. Connector tab 136 includes system connector 140 and connector tab 138 includes conductive contacts 142 through 152. In embodiments in which power stage 102-112 is intended to be independently assignable to either feedback loop 122 or 124, it may be beneficial for each of conductive contacts 142 through 152 to be electrically isolated from one another. In other words, conductive contact 142 may be isolated from each of conductive contacts 144-152. This would enable, in theory, a configuration in which power stage 102 provides a first output through conductive contact 142 (for example, as controlled by feedback loop 122) and phases 104-112 all combine to provide a second output through conductive contacts 144-152. Further, by designing VRM 100 such that each of conductive contacts 144-152 are also electrically isolated from each other, every power stage could, in theory, provide a single output, similar to the example above with respect to power stage 102.

On the other hand, if VRM 100 is designed to be utilized in a closed set of systems that would never require a set of particular power stages to provide power to different outputs, the conductive contacts of those power stages could be electrically connected. For example, if power stages 102 and 104 provide power to the same output in all configurations of VRM 100, conductive contacts 142 and 144 may not benefit from being electrically isolated. Rather, in that example, power stages 102 and 104 could be connected to one conductive contact rather than two physically distinct conductive contacts.

It is of note that connector tabs 136 and 138, system connector 140, and conductive contacts 142 through 152 are example abstract representations of a method by which VRM card 100 could be inserted into and connected with a motherboard or system backplane. In other embodiments, other connection form factors, connectors, and numbers of connectors could be used.

System connector 140 may act as a connection point between the system motherboard through which a system property could be transmitted from the system board to configuration selector 126. This system property could be transmitted from system connector 140 through trace 154 to configuration selector 126. This system property could take various forms based on the implementation of VRM card 100. For example, if VRM card 100 is designed to operate between two configurations, the system property could take the form of a "high" or "low" value. It could also be a combination of binary values that are transmitted through a set of pins and traces, such as a set of three "high" or "low" values, resulting in 8 potential configurations (e.g., 000, 010, 100, etc.) The system property could also be a configuration number or model identifier of the computer system, which configuration selector 126 may be able to cross reference with a list of VRM configurations in an on-board memory. The form factor of system connector 140, therefore, may vary based on the type of signal being used to identify the system property. If the simple presence or absence of voltage (or a high or low voltage) at a connection is used to identify a system power property, for example, system connector 140 could take the form of one or more trace contacts that could transmit that voltage. If, on the other hand, the system power property is identified based on the system's serial number, or a number of outputs and voltage ranges required for those outputs, a more complex connection such as a signal connector cluster may be required.

Conductive contacts 142 through 152 may act as outputs for each of power stages 102 though 152. For example, the voltage that is output by power stage 102 may be transferred to the overall computer system through a connection between conductive contact 142 and the system board. The components to which that output voltage is routed may depend upon the system configuration. For example, if power stages 102 and 104 are combined into a single output to provide voltage to a memory module, conductive contacts 142 and 144 would provide voltage to that memory through connections on the system board.

Finally, while not illustrated herein, configuration selector 126 could identify the VRM configuration based on impedance measurements between conductive contacts 142 through 152 rather than through system connector 140. For example, if power stages 102 through 106 are combined into one output (e.g., to a first processor core) and power stages 108 are combined into a second output (e.g., to a second processor core), conductive contacts 142 through 146 would be connected to a different board component than conductive contacts 148 through 152. For that reason, an impedance measurement between conductive contacts 142, 144, and 146 (or between conductive contacts 148, 150, and 152) would be minimal, while an impedance measurement between any of conductive contacts 142, 144, and 146 and conductive contacts 148, 150, and 152 could be significantly larger. Thus, upon being plugged into a system board, configuration selector 126 could perform impedance measurements between various pairs of conductive contacts 142 through 152 to identify which conductive contacts are combined into outputs. Those conductive-contact combinations could then be used as a basis for identifying the power stages that should be grouped together into a single feedback loop 122 or 124.

Figure 1B:
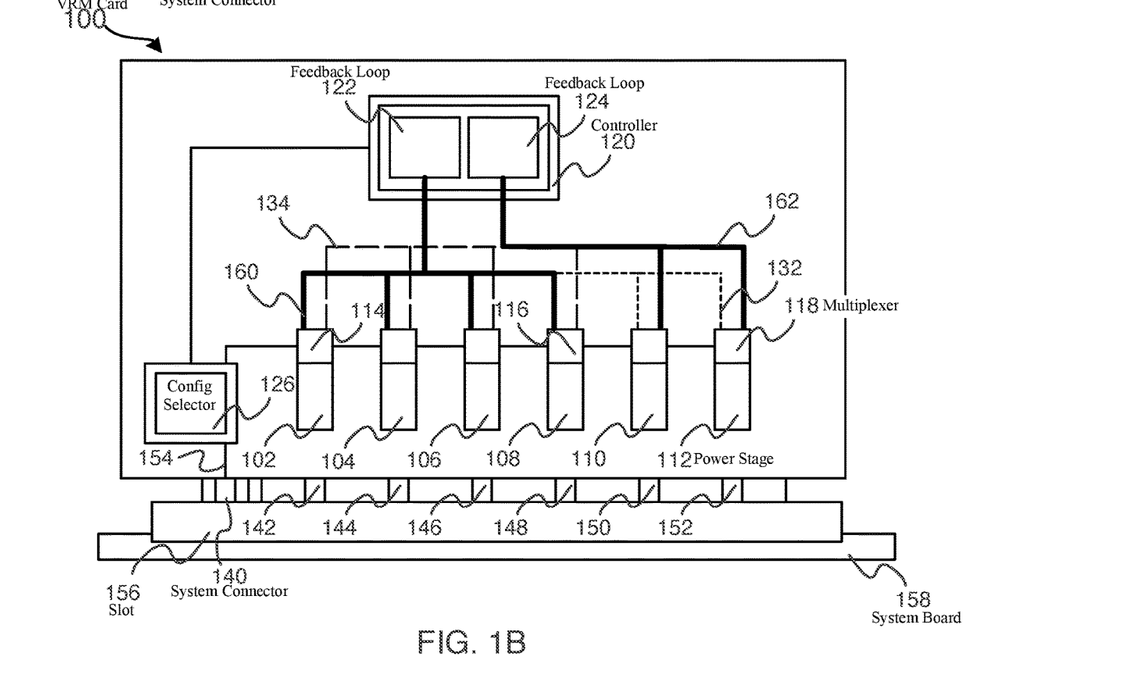
FIG. 1B depicts a second view of a configurable discrete VRM card after being attached to a first system.

To ease in understanding, FIG. 1B depicts a second view of configurable discrete VRM 100 card after being attached to a first system. In FIG. 1B, connector tabs 136 and 138 have been inserted into a slot 156 on a system board 158. As inserted, conductive contacts 140 through 152 may make contact with corresponding contacts within slot 156, enabling communication with the first system through system board 158. Through system connector 140 and trace 154, the first system could transmit a system property to configuration selector 126. Configuration selector 126 could then transmit instructions to each power-stage critical-signal multiplexer to select an output that would connect the corresponding power stage to the correct feedback loop. These output selections and connections are depicted in FIG. 1B using dark, solid lines superimposed over short dashed line 132 and long dashed line 134.

For example, solid line 160 illustrates the connected outputs of the power-stage critical-signal multiplexers of power stages 102, 104, 106, and 108 including power-stage critical-signal multiplexers 114 and 116. Solid line 160 illustrates a connection of power stages 102 through 108 to feedback loop 122. As such, FIG. 1B illustrates that feedback loop 122 would control a first output of VRM card 100, which would consist of power stages 102 through 108 and would be transmitted to board 158 through conductive contacts 142 through 148.

On the other hand, solid line 162 illustrates the connected outputs of the power-stage critical-signal multiplexers of power stages 110 and 112, including power-stage critical-signal multiplexer 118. Solid line 162 illustrates a connection of power stages 110 and 112 to feedback loop 124. As such, FIG. 1B illustrates that feedback loop 124 would control a first output of VRM card 100, which would consist of power stages 110 and 112 and would be transmitted to board 158 through conductive contacts 150 and 152.

Figure 1C:
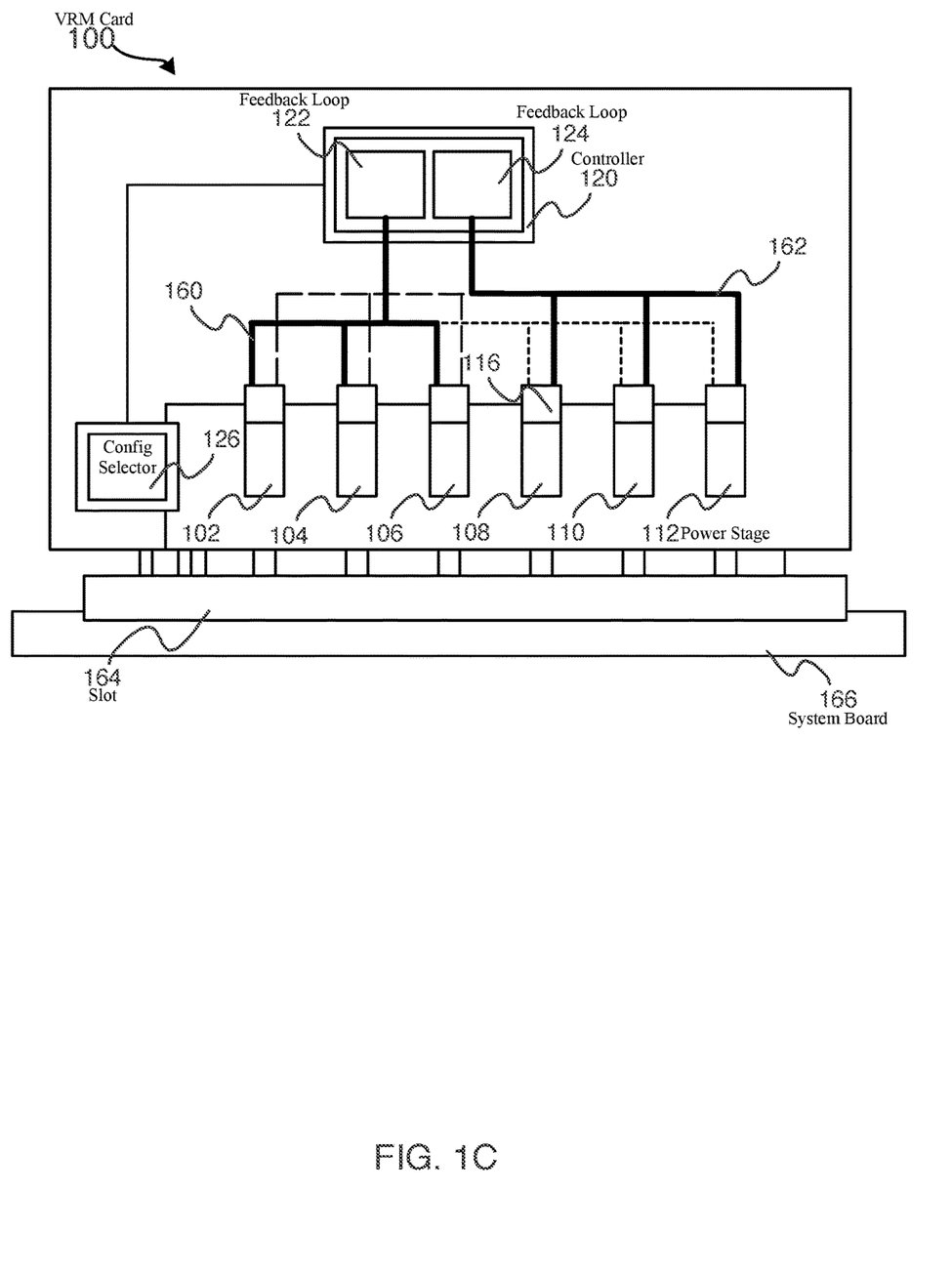
FIG. 1C depicts a third view of a configurable discrete VRM card after being attached to a second system.

FIG. 1C depicts a third view of configurable discrete VRM card 100 after being attached to a second system. VRM card 100, as illustrated in FIG. 1C, has been inserted into slot 164 of system board 166 of the second system. Due to a difference in the power requirements between the first system and the second system, the system property received by configuration selector 126 is different than the system property received in FIG. 1B. As a result, configuration selector has organized power stages 102 through 112 into different outputs. Specifically, as compared to the configuration illustrated in FIG. 1B, power-stage critical-signal multiplexer 116 has switched its output, causing it to connect to feedback loop 124 rather than 122. As a result, VRM card 100 now delivers two outputs of 3 power stages each, rather than one output of four power stages and one output of two power stages. Specifically, power stages 102 through 106 are now controlled by feedback loop 122 in a first output, and power stages 108 though 112 are now controlled by feedback loop 124 in a second output.

The switch between the configurations illustrated in FIGS. 1B and 1C may have occurred, for example, if the system of FIG. 1B included one processor die and one memory, both of which were powered by VRM card 100. The processor die, for example, may have required 4 power stages, whereas the memory may have only required two power stages. The system of FIG. 1C, however, may have included a processor package with two connected processor dies that each required their own output. In this system, the individual dies may be smaller than the single die in FIG. 1B, and thus three power stages may be sufficient to power each individual die. Further, the second system may have an embedded VRM built onto system board 166 that provides power to the system memory, and thus VRM card 100 would not need to devote any of power stages 102 through 112 to the system memory. Thus, all 6 of power stages 102 through 112 could be devoted to the processor package.

Figure 2:
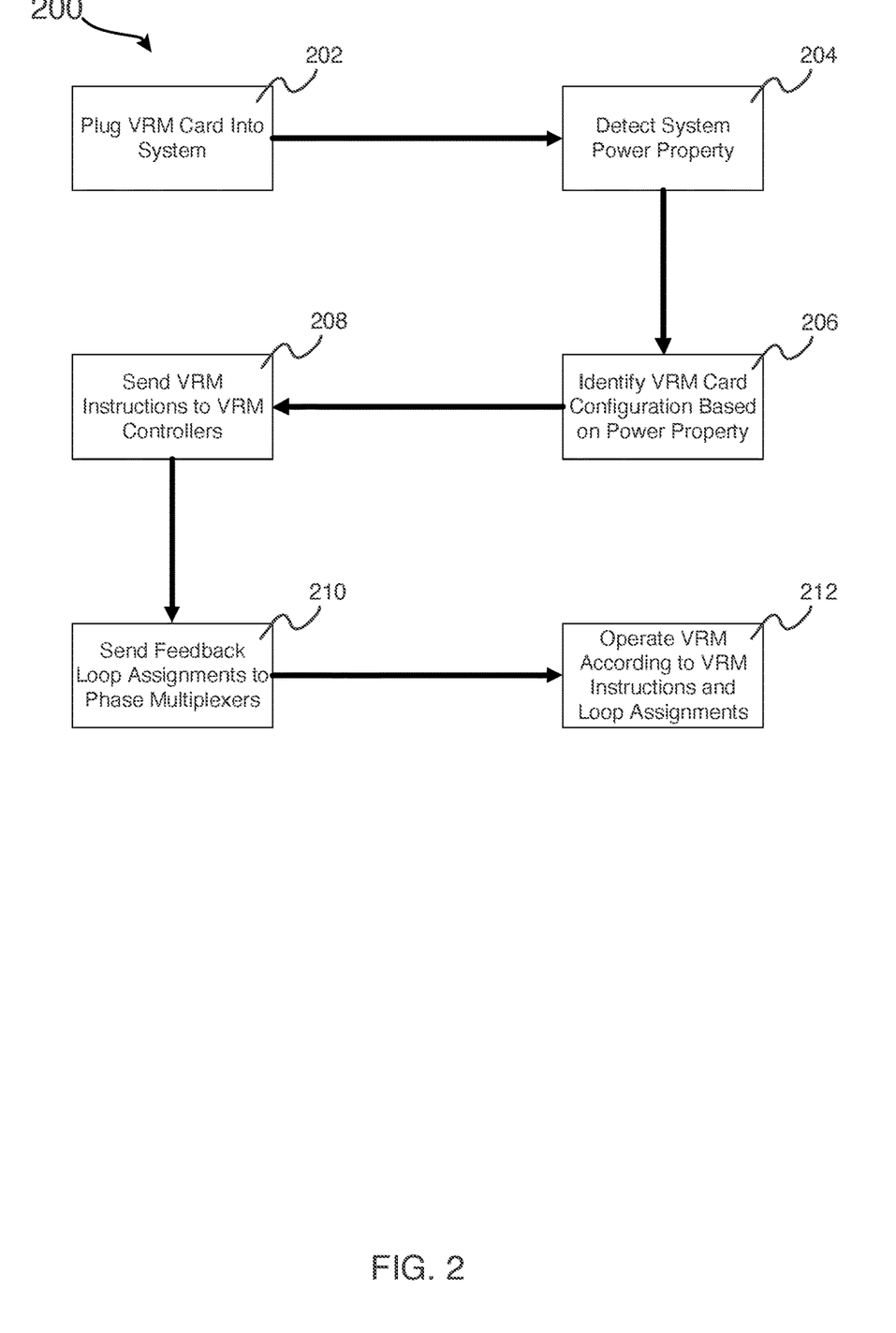
FIG. 2 depicts a method of using a configurable discrete VRM card.

FIG. 2 depicts a method 200 of using a configurable discrete VRM card. Method 200 could be performed, for example, using VRM card 100 of FIGS. 1A through 1C, VRM card 300 of FIG. 3 or VRM card 400 of FIG. 4. Method 200 begins in block 202, in which the VRM card is plugged into a system designed to receive power from the VRM card. Upon being plugged into the system, the VRM card detects a power property of the system in block 204. A power property, as used herein, may refer to a power requirement of the system (e.g., number of outputs, voltage ranges of those outputs), a system identifier (e.g., a model number, a serial number), or an identification of a power configuration number (e.g., a binary code, configuration 5) This detection could occur in several ways, depending on how the VRM card and the system are designed to communicate.

For example, a conductive contact on the VRM card connector (e.g., a contact on a card-edge connector of the VRM card) could complete a circuit with a contact on the system board. The voltage or current running through that circuit may be, in some embodiments, indicative of the system power property. In these embodiments, a configuration selector on the VRM card may read the voltage or current flowing through that circuit to determine the power property. For example, if a VRM card is designed to provide power to three different products with three different power requirements, each of those products may form a circuit with the configuration selector in a different voltage range. One of those products may be designed to form a circuit containing voltage between 0 and 3 volts, a second of those products may be designed to form a circuit containing voltage between 5 and 8 volts, and a third of those products may be designed to form a circuit containing voltage between 10 and 13 volts. In this example, whether the system is the first, second, or third product may be the system power property, which may be identifiable by the configuration selector by identifying the voltage range of the circuit formed with the product.

In another example, conductive contacts on the VRM card connector could contact a set of pins on the system board (or in a slot mounted on the system board). A configuration selector could identify a system power property by determining which of those pins is connected to a circuit through which a voltage exists (i.e., in which pins a voltage is detected). That determination could be used to formulate a code that could then be used to identify the power requirements of the system. Either this code or the power requirements could be referred to as the power property, in this example. For example, a VRM card connector could contact a set of four pins on the system board. The configuration selector could determine that the first and third pins in the set have a measurable in them, resulting in a code of "1010." In some embodiments, this code could be cross referenced against a table that correlates the code with system power requirements (or VRM configurations). In other embodiments, the voltage of the pins could be connected to a series of logic gates that could be used to set the output of the configuration selector. With a set of four pins, there would be 16 possible combinations of codes, giving a potential of 16 possible outputs.

In another example, conductive contacts on the VRM card connector could form a connection between the configuration selector on the card and a memory on the system board. If the configuration selector took the form of a microprocessor, the configuration selector could then request and process a variety of information from that memory that could serve as the system's power property. For example, the configuration selector could request the serial number of the system, the model number of the system, the number of outputs required to be powered by the VRM card, voltage ranges of the components on the board, a VRM-card configuration number that corresponds to the system's power needs, and others. The configuration selector could then analyze this information to determine the power requirements of the system.

In another example, the VRM card connector may not include any contacts that are dedicated to gathering information regarding the computer system to which the VRM card is connected. Rather, the configuration selector could analyze the connections formed between the power stages of the VRM card connector and the computer system. For example, a VRM card may have 16 contacts on a card-edge connector, each of which may be specific to one of 16 power stages on the VRM card. A configuration selector could perform impedance measurements between each contact to determine which of the contacts are connected to the same components. If, for example, the first four contacts were connected to the same set of memory modules, very little impedance would exist between those four contacts. Similarly, if contacts 5-10 and contacts 11-16 were both connected to separate processors, very little impedance would be measured between any of contacts 5-10 and any of contacts 11-16. However, a comparatively greater impedance would likely be measured between a contact of one of these ranges and a contact of another of these ranges (e.g., between 3 and 6, 8 and 13, 4 and 12). Thus, by measuring these impedance values, the configuration selector could identify the number of outputs needed by the system (in this example, 3) and the number of power stages for each (in this example, 4, 6, and 6). These numbers could be used as the system power property.

Regardless of how the system power property is detected in block 204, the system power property could be used in block 206 to identify a configuration of the VRM card that would be necessary to meet the system's power requirements. This may include, for example, selecting one of a limited number of pre-determined configurations of the VRM card. For example, if the power property detected in block 204 identifies the computer system as one of two products that the VRM is designed to power, block 206 may include identifying the power configuration that corresponds to that product. This may be as simple as causing a configuration selector to select one of two outputs based on whether the system power property is high (i.e., an "on" input) or low (i.e., an "off" input). In other embodiments, block 206 may include cross referencing a binary code, serial number, or model number with a table in memory that that correlates those numbers with VRM card configuration numbers.

Once the configuration selector identifies the VRM card configuration in block 206, the configuration selector can send, in block 208, VRM instructions to a set of VRM controllers based on that identified configuration. The format of these VRM instructions may differ based on the embodiment of the VRM card. For example, in some embodiments, the VRM instructions may comprise a voltage target, power-stage assignments, VRM instructions, etc.

For example, a configuration selector may output a voltage that falls within one of a set of pre-defined voltage ranges to the VRM controllers. The VRM controller may detect that voltage and, based on the pre-defined voltage range in which the voltage falls, fetch a configuration file from a memory module on the VRM card. In this example, the VRM instructions sent to the VRM controllers takes the form of a voltage that would instruct the VRM controllers to fetch a particular configuration file.

Similarly, a configuration selector could also output a series of voltages that could be interpreted as a configuration code. For example, the configuration selector could output two pulses of power at a particular voltage, either simultaneously or in series, that each fall within one of three voltage ranges (e.g., ranges A, B, and C). Receiving a first signal in the second range (e.g., range B) and a second signal in the first range (e.g., range A) could inform a VRM controller to fetch a configuration file that corresponds to configuration "BA," whereas receiving a first signal in the third range and a second signal in the third range could instruct a VRM controller to fetch a configuration file that corresponds to configuration "CC." These configuration files may inform the VRM controllers which power stages each feedback loop is controlling and the target voltage range.

As another example, a more complex configuration selector (e.g., an ASIC or microprocessor) could, in response to identifying the VRM card configuration in block 206, fetch a corresponding configuration file from a memory module and forward VRM instructions to the VRM controllers based on those instructions. In some such embodiments, these VRM instructions may simply be the fetched configuration file, in other embodiments, the configuration selector may send specific instructions to each VRM controller or feedback loop. For example, the configuration selector may send instructions to a feedback loop of a first controller to keep the total output within voltage range 1, and may send instructions to a feedback loop of a second controller to keep the total output within voltage range 2.

Once the configuration selector identifies the VRM card configuration in block 206, the configuration selector can send, in block 210, feedback loop assignments to the power-stage critical-signal multiplexers. Similar to the VRM instructions sent in block 208, the form of these assignments may vary based on the implementation of the VRM card. For example, in some embodiments the configuration selector could send, to all power-stage critical-signal multiplexer, a signal of a particular voltage (e.g., high or low). That signal could be provided as the input to each power-stage critical-signal multiplexer circuit, which could cause each power-stage critical-signal multiplexer "select" an output (e.g., a cluster of signals) that corresponds to one of the VRM controller's feedback loops. For example, a signal of 10V may cause a power-stage critical-signal multiplexer for power stage 3 to select the second feedback loop of controller 1, whereas the same voltage signal may cause a power-stage critical-signal multiplexer for power stage 9 to select the first feedback loop of controller 3. This embodiment may be beneficial, for example, when the number of potential configurations for a VRM card is low and can be identified in advance.

In another embodiment, the configuration selector may output a separate signal to each power-stage critical-signal multiplexer. This could be accomplished by an analog voltage programmable selection mechanism. For example, the configuration selector may output a 2V signal to a first power-stage critical-signal multiplexer, a 5V signal to a second power-stage critical-signal multiplexer, and a 10V signal to a third power-stage critical-signal multiplexer. In this example, every power-stage critical-signal multiplexer may have four outputs. The first output may be selected when receiving a signal between 0V and 3.0V, the second output may be selected when receiving a signal between 3.1V and 6.0V, the third output may be selected when receiving a signal between 6.1V and 9.0V, and the fourth output may be selected when receiving a signal between 9.1V and 12V. Thus, in this example, the first power-stage critical-signal multiplexer would select the first output (e.g., the first feedback loop of the first controller), the second power-stage critical-signal multiplexer would select the second output (e.g., the second feedback loop of the first controller), and the third power-stage critical-signal multiplexer would select the fourth output (e.g., the second feedback loop of the second controller). This embodiment may be beneficial, for example, when the number of potential configurations for a VRM card is high, or when those configurations cannot be determined in advance. By updated the voltages sent to each individual power-stage critical-signal multiplexer in block 210 when the configuration selector detects the system power property in block 204 (or identifies the VRM card configuration in block 206), new combinations of power stages could be created, enabling the outputs of the VRM card to be updated and customized.

Once the configuration selector sends the VRM instructions in block 208 and the feedback loop assignments in block 210, the VRM controllers and power stages should be ready to operate together and output power that meets the voltage requirements of the system into which the VRM card was plugged in block 202. Thus, the VRM card may then be operated according to the VRM instructions and loop assignments in block 212.

Throughout this disclosure, examples of discrete VRM cards have been provided with various numbers of power stages and controllers. As such, it should be understood that the concepts illustrated herein can be applied to discrete VRM cards without explicit restriction to the number of power stages and controllers. In some use cases, a limited number of controllers and power stages may be beneficial. For example, if the VRM card is designed to only serve a limited number of pre-determined computer systems with a set of pre-determined power requirements, including more controllers and power stages than is necessary to serve those pre-determined computer systems may add to the cost of designing and manufacturing the VRM without providing benefit. Similarly, such a VRM card may not benefit from controllers, power-stage critical-signal multiplexers, and configuration selectors that are flexible and updatable (for example, by installing new hardware instructions or firmware updates). However, if the VRM card is designed to serve an uncertain number of computer systems with various, uncertain power requirements, it may be beneficial to design the VRM card to include a larger number of controllers and power stages, increasing the chances that the VRM card would be able to adjust to the power requirements of future computer systems. Similarly, it may also be beneficial for such a VRM card to be designed in a way that allows the VRM card to adjust to the needs of future systems (e.g., by updating the configuration selector with new software or updating a memory module on the VRM with new computer-system models and corresponding VRM configurations).

Figure 3:
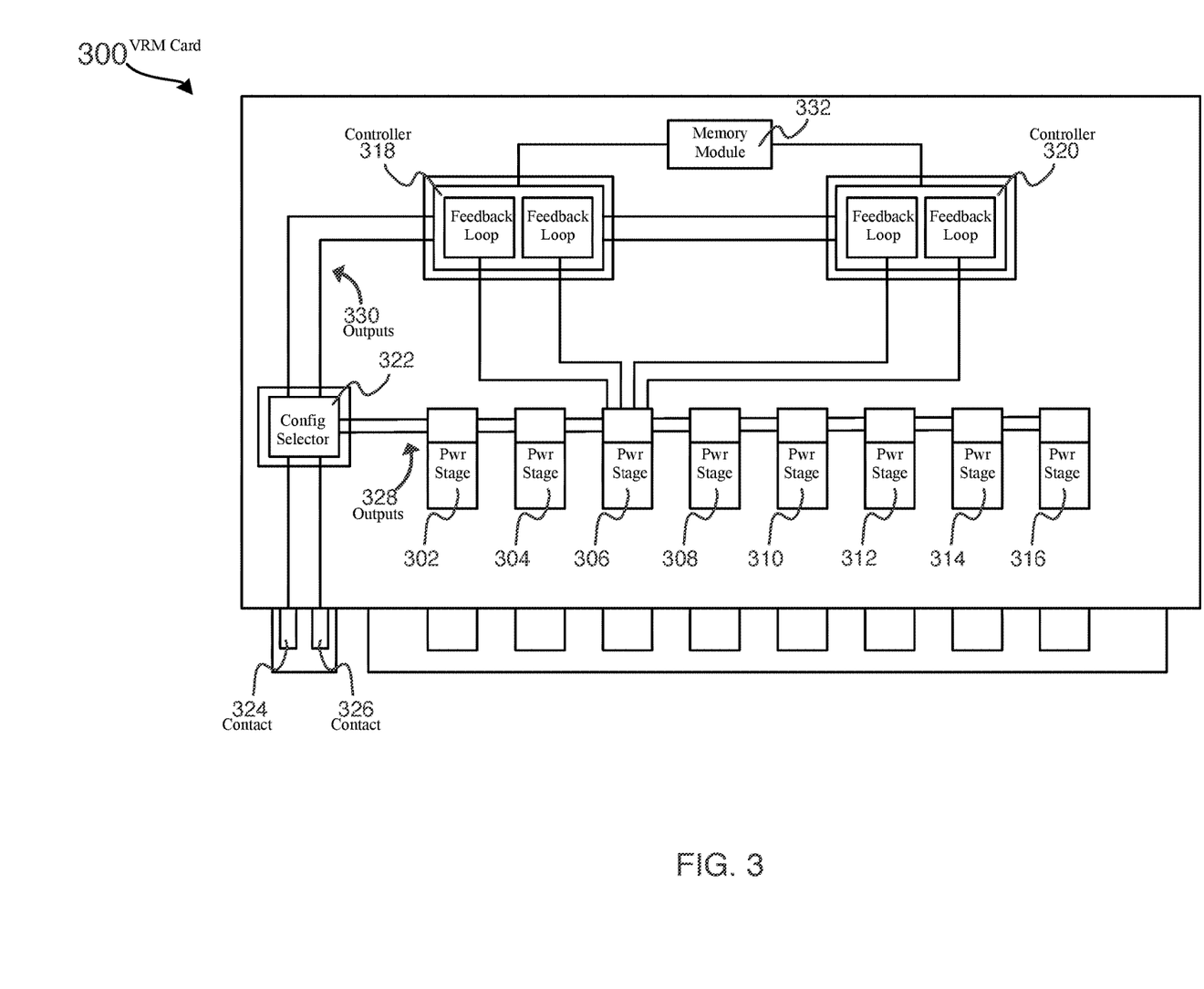
FIG. 3 depicts a configurable discrete VRM card that can be configured by a set of contacts on the VRM card connector.

FIG. 3 depicts a configurable discrete VRM card 300 that can be configured by a set of contacts on the VRM card connector. VRM card 300 may be beneficial in use cases in which the VRM card is designed to only serve a limited number of pre-determined computer systems with a set of pre-determined power requirements.

For example, VRM card 300 includes 8 power stages 302 through 316 with corresponding power-stage critical-signal multiplexers. VRM card 300 also includes two VRM controllers 318 and 320, each with two feedback loops. While only the outputs from the multiplexer attached to power stage 306 are depicted in FIG. 3, this is for the sake of presentation and understanding. In reality, each of power stages 302 through 316 could be connected to all four feedback loops.

VRM card 300 also includes a configuration selector 322 that can detect a power system property through contacts 324 and 326. Contacts 324 and 326 may, for example, contact corresponding pins when VRM card 300 is inserted into a computer system. These pins may conduct current to contacts 324 and 326 that falls within a pre-determined set of voltage ranges. For example, by pre-determining a set of two voltage ranges (e.g., 0V to 3V and 3V to 6V), contacts 324 through 326 could together detect a total of 4 possible combinations of voltage ranges. This may be sufficient, for example, if VRM card 300 is designed to provide power to three pre-determined computer systems. The first computer system, for example, may be a desktop system that may require 2 output voltage signals (e.g., power stages 302 through 312 for a core processor and 314 through 316 for cache memory), the second computer system, for example, may be a storage server may require four output power signals (e.g., power stages 302 and 304, power stages 306 and 308, power stages 310 and 312, and power stages 314 and 316, each for separate memory modules), and the third computer system may be a compute server that may require one output (e.g., power stages 302 through 316 for a core processor).

Configuration selector 322 may provide feedback-loop assignments to each of power stages 302 through 316 using outputs 328 and VRM instructions to controllers 318 and 320 through outputs 330. In some embodiments, for example, configuration selector 322 may forward the signals that it receives from contacts 324 through 326 through outputs 328 and 330. In these embodiments, configuration selector 322 may take the form of a splitter/repeater.

The power-stage critical-signal multiplexers, upon receiving the feedback-loop assignments, may select an output that connects their corresponding power stage to one of the feedback loops. In the earlier example in which VRM card 300 is designed to provide power to three pre-determined computer systems, a first and a third combination of voltages provided by output 328 may cause power stage 306 to connect to the first feedback loop of controller 318, whereas a second combination of voltages may cause power stage 306 to connect to the first feedback loop of controller 320.

VRM controller 318 and 320 may receive the VRM instructions in output 330 and retrieve a VRM configuration file from memory module 332 based on those VRM instructions. In the earlier example in which VRM card 300 is designed to provide power to three pre-determined computer systems, a first combination of voltages provided by output 330 may cause each controller 318 and 320 to fetch a first VRM configuration file, a second combination of voltages may cause each controller 318 and 320 to fetch a second VRM configuration file, and a third combination of voltages may cause each controller 318 and 320 to fetch a third VRM configuration file. Alternatively, each controller 318 and 320 may fetch VRM configuration files that are specific to that individual controller, resulting in 6 possible VRM configuration files, rather than three. These VRM configuration files may inform each controller of the power stages that each feedback loop is controlling, and the output ranges that each feedback loop is to target.

Figure 4:
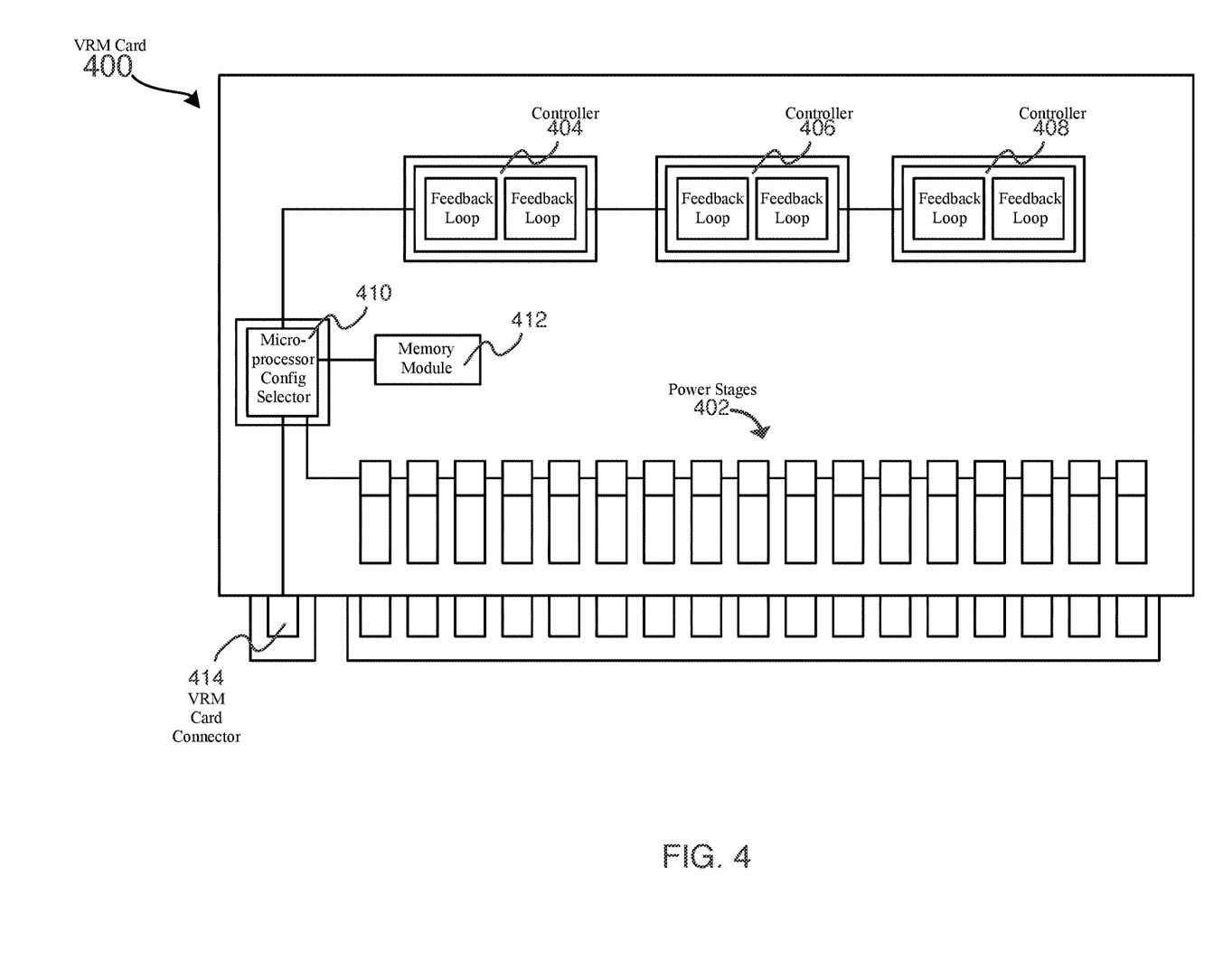
FIG. 4 depicts a configurable discrete VRM card that can be configured by a configuration selector chip.

FIG. 4 depicts a configurable discrete VRM card 400 that can be configured by a configuration selector chip. VRM card 400 may be beneficial in use cases in which the VRM card is designed to serve an uncertain number of computer systems with various, uncertain power requirements. For example, VRM card 400 has been designed with a large number of power stages 402, each with an attached power-stage critical-signal multiplexer. VRM card 400 has also been designed with three VRM controllers 404-408, each with two feedback loops. This would give VRM card 400 a total of 6 possible power outputs and a large number of power-stage combinations.

VRM card 400 also has been designed with a microprocessor configuration selector 410 and dedicated configuration memory module 412. This microprocessor configuration selector 410 could be used to process a large variety of power properties and cross reference them with information in the configuration memory module 412, enabling microprocessor configuration selector 410 to send a variety of feedback-loop assignments to the power-stage critical-signal multiplexers of power stages 402 and VRM instructions to controllers 404 through 408. Microprocessor 410 is connected to VRM card connector 414. VRM card connector 414 may interface with a contact in a socket on a computer system's main board (e.g., a motherboard or backplane) and receive a power property from a memory on that computer system. That power property may take various forms, such as a configuration number (e.g., configuration 521), a model number of the computer system, a serial number of the computer system, or even requested power requirements (e.g., one 3-power-stage output at 1.2V, one 8-power-stage output at 4.2V, and one 4-power-stage output at 3.0V).

VRM card connector 414 may also be used to update the firmware of microprocessor configuration selector 410 and the files within configuration memory module 412. For example, if a new system is developed that will be powered by VRM 400, VRM 400 could be updated by downloading an updated table to configuration memory module 412 that lists the model number of that new system, along with the feedback-loop assignments and VRM instructions required to provide power to that new system.

Figure 5:
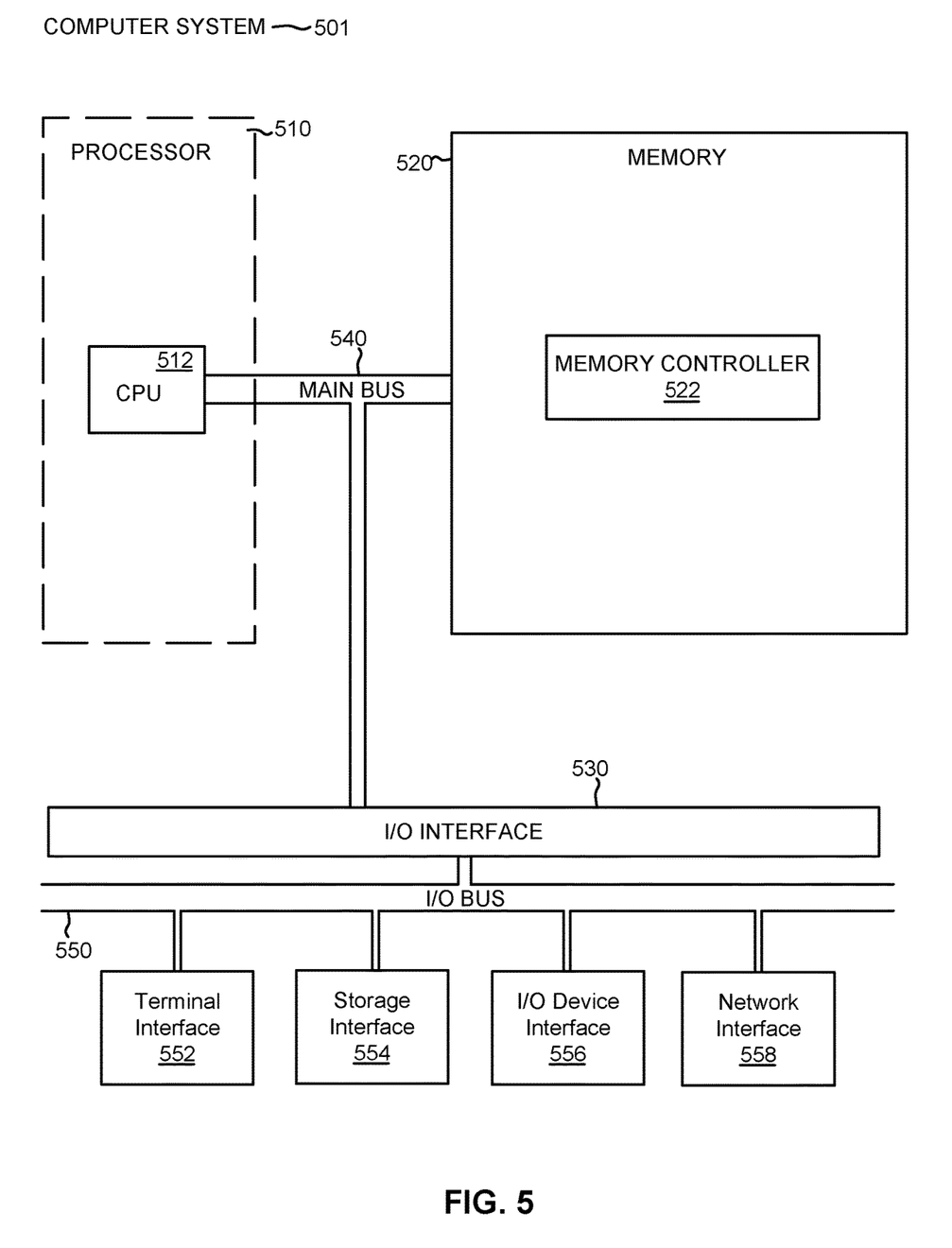
FIG. 5 depicts the representative major components of a computer system that may be used in accordance with embodiments.

FIG. 5 depicts the representative major components of an example Computer System 501 that may be used in accordance with embodiments of the present disclosure. The particular components depicted are presented for the purpose of example only and are not necessarily the only such variations. The Computer System 501 may include a Processor 510, Memory 520, an Input/Output Interface (also referred to herein as I/O or I/O Interface) 530, and a Main Bus 540. The Main Bus 540 may provide communication pathways for the other components of the Computer System 501. In some embodiments, the Main Bus 540 may connect to other components such as a specialized digital signal processor (not depicted).

The Processor 510 of the Computer System 501 may include one or more CPUs 512.

The Processor 510 may additionally include one or more memory buffers or caches (not depicted) that provide temporary storage of instructions and data for the CPU 512. The CPU 512 may perform instructions on input provided from the caches or from the Memory 520 and output the result to caches or the Memory 520. The CPU 512 may include one or more circuits configured to perform one or methods consistent with embodiments of the present disclosure. In some embodiments, the Computer System 501 may contain multiple Processors 510 typical of a relatively large system. In other embodiments, however, the Computer System 501 may be a single processor with a singular CPU 512.

The Memory 520 of the Computer System 501 may include a Memory Controller 522 and one or more memory modules for temporarily or permanently storing data (not depicted). In some embodiments, the Memory 520 may include a random-access semiconductor memory, storage device, or storage medium (either volatile or non-volatile) for storing data and programs. The Memory Controller 522 may communicate with the Processor 510, facilitating storage and retrieval of information in the memory modules. The Memory Controller 522 may communicate with the I/O Interface 530, facilitating storage and retrieval of input or output in the memory modules. In some embodiments, the memory modules may be dual in-line memory modules.

The I/O Interface 530 may include an I/O Bus 550, a Terminal Interface 552, a Storage Interface 554, an I/O Device Interface 556, and a Network Interface 558. The I/O Interface 530 may connect the Main Bus 540 to the I/O Bus 550. The I/O Interface 530 may direct instructions and data from the Processor 510 and Memory 520 to the various interfaces of the I/O Bus 550. The I/O Interface 530 may also direct instructions and data from the various interfaces of the I/O Bus 550 to the Processor 510 and Memory 520. The various interfaces may include the Terminal Interface 552, the Storage Interface 554, the I/O Device Interface 556, and the Network Interface 558. In some embodiments, the various interfaces may include a subset of the aforementioned interfaces (e.g., an embedded computer system in an industrial application may not include the Terminal Interface 552 and the Storage Interface 554).

Logic modules throughout the Computer System 501—including but not limited to the Memory 520, the Processor 510, and the I/O Interface 530—may communicate failures and changes to one or more components to a hypervisor or operating system (not depicted). The hypervisor or the operating system may allocate the various resources available in the Computer System 501 and track the location of data in Memory 520 and of processes assigned to various CPUs 512. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A discrete VRM card comprising:
   a set of VRM controller circuits, wherein the set comprises a VRM controller circuit with two feedback loops;
   a power stage;
   a power-stage critical-signal multiplexer, wherein the output of the power-stage critical-signal multiplexer determines a feedback loop with which the power stage communicates; and
   a configuration selector, wherein the configuration selector determines a feedback-loop assignment for the power-stage critical-signal multiplexer and provides VRM instructions to the VRM controller circuit.

2. The discrete VRM card of claim 1, wherein the configuration selector provides the feedback-loop assignment to the VRM controller circuit, and wherein the VRM controller circuit loads a configuration file based on the feedback-loop assignment and the VRM instructions.

3. The discrete VRM card of claim 1, wherein the configuration selector provides the feedback-loop assignment to the power-stage critical-signal multiplexer.

4. The discrete VRM card of claim 1, wherein the configuration selector is configured to receive a system power property from a computer system with which the discrete VRM card is connected, wherein the feedback-loop assignment and the VRM instructions are based on the system power property.

5. The discrete VRM card of claim 1, wherein the configuration selector is a multiplexer.

6. The discrete VRM card of claim 4, wherein the feedback-loop assignment is a voltage signal within a predetermined voltage range.

7. The discrete VRM card of claim 4, wherein the VRM instructions are a combination of voltage signals.

8. The discrete VRM card of claim 1, wherein the configuration selector is an FPGA.

9. The discrete VRM card of claim 1, wherein the configuration selector is a microprocessor.

10. The discrete VRM card of claim 1, wherein the VRM instructions comprise a configuration file.

11. The discrete VRM card of claim 1, wherein the VRM instructions comprise:
    a list of power stages; and
    a voltage range.

12. A method comprising:
    plugging a VRM card into a system board of a computer system;
    detecting, by the VRM card, a power property of the computer system;

identifying, by the VRM card, a VRM card configuration based on the power property;

sending by the VRM card, based on the identifying, VRM instructions to a set of VRM controller circuits on the VRM card;

sending by the VRM card, based on the identifying, a set of feedback-loop assignments to a power-stage critical-signal multiplexer on the VRM card; and operating the VRM card according to the VRM instructions and feedback-loop assignments.

13. The method of claim 12, wherein the VRM instructions comprise a signal that identifies a configuration file.

14. The method of claim 12, wherein the power property comprises a voltage signal within a pre-determined voltage range.

15. The method of claim 13, wherein the sending the VRM instructions comprises sending the signal to the set of VRM controller circuits.

16. The method of claim 12, wherein the power property is a model number of the computer system.

17. The method of claim 15, wherein the identifying comprises cross referencing the power property with a list of VRM card configurations on a memory module on the VRM card.

18. The method of claim 12, wherein detecting the power property comprises performing impedance measurements on a set of contacts that form a connection between a set of power stages on the VRM card and a set of components in the computer system.

19. A computer program product, the computer program product comprising a computer readable storage medium having program instructions embodied therewith, the program instructions executable by a VRM card to cause the VRM card to:

detect that the VRM card is inserted into a computer system;

detect a power property of the computer system;

identify a VRM card configuration based on the power property;

send, based on the identifying, VRM instructions to a VRM controller circuit on the VRM card;

send, based on the identifying, a feedback-loop assignment for a power-stage critical-signal multiplexer on the VRM card.

20. The computer program product of claim 19, wherein the feedback-loop assignment is sent to the VRM controller circuit.

21. The computer program product of claim 19, wherein the feedback-loop assignment is sent to the power-stage critical-signal multiplexer.

22. The computer program product of claim 19, wherein the detecting a power property comprises:

reading a set of voltage signals sent to the VRM card;

categorizing each voltage signal in the set of voltage signals into a voltage range in a set of pre-determined voltage ranges;

forming, based on the categorizing, a VRM configuration number.

23. The computer program product of claim 22, wherein the VRM configuration number comprises a list of voltage ranges that represent the set of voltage signals.

24. The computer program product of claim 19, wherein the power property comprises a set of requested power outputs and a power requirement for each power output in the set of requested power outputs.

25. The computer program product of claim 19, wherein the program instructions further cause the VRM card to:

receive, at the VRM card, an updated list that correlates power properties and VRM card configurations; and store the updated list in a memory module on the VRM card.

* * * * *